(12) United States Patent
Acosta-Salmón et al.

(10) Patent No.: US 8,707,902 B2
(45) Date of Patent: Apr. 29, 2014

(54) METHODS FOR PRODUCING CULTURED PEARLS IN CONCH AND OTHER GASTROPODS

(75) Inventors: Héctor Acosta-Salmón, La Paz (MX); Megan Davis, Fellsmere, FL (US)

(73) Assignee: Florida Atlantic University Research Corporation, Boca Raton, FL (US)

( * ) Notice: Subject to any disclaimer, the term of this patent is extended or adjusted under 35 U.S.C. 154(b) by 587 days.

(21) Appl. No.: 12/751,316

(22) Filed: Mar. 31, 2010

(65) Prior Publication Data

US 2010/0251968 A1      Oct. 7, 2010

Related U.S. Application Data

(60) Provisional application No. 61/165,157, filed on Mar. 31, 2009.

(51) Int. Cl.
*A01K 61/00* (2006.01)

(52) U.S. Cl.
USPC ............................................. 119/244

(58) Field of Classification Search
CPC .................................... A01K 61/002
USPC .......................................... 119/244
See application file for complete search history.

(56) References Cited

U.S. PATENT DOCUMENTS

| | | | |
|---|---|---|---|
| 3,871,333 A | | 3/1975 | Gotoh |
| 5,347,951 A | | 9/1994 | Fankboner |
| 2004/0112086 A1 | | 6/2004 | Huynh |
| 2007/0193526 A1 | | 8/2007 | Batzer |
| 2010/0005835 A1 * | | 1/2010 | Johnson et al. .................. 63/36 |

FOREIGN PATENT DOCUMENTS

| | | | |
|---|---|---|---|
| EP | 1 084 615 | 3/2001 | |
| IT | WO2004/052090 A2 * | 6/2004 | ............ A01K 61/00 |
| JP | H09 252680 A | 9/1997 | |
| JP | 2006 296274 A | 2/2006 | |
| WO | WO 99/25185 | 5/1999 | |
| WO | WO 2008/149406 A1 | 11/2008 | |

OTHER PUBLICATIONS

Acosta-Salmón, H., et al. "A new approach to pearl oyster broodstock selection: can saibo donors be used as future broodstock?" *Aquaculture*, 2004, pp. 205-214, vol. 231.
Acosta-Salmón, H., et al., "Inducing relaxation in the queen conch *Strombus gigas* (L.) for cultured pearl production," *Aquaculture*, 2007, pp. 73-77, vol. 262.
Dan, H., et al., "Freshwater pearl culture in China," *Global Aquaculture Advocate*, 2003, pp. 50-51, vol. 6, No. 3.
Davis, M., et al., "A guide for culturing queen conch," *Am. Fish. Soc. Symp.*, 2005, pp. 125-142, vol. 46.
Ellis, S., et al., "Producing pearls using the black-lip pearl oyster (*Pinctada margaritifera*)," *Aquafarmer Information Sheet*, Center for Tropical and Subtropical Aquaculture, Dec. 1999, Special Publication No. 141.
Fiske, D., et al., "Continuity and change in Chinese freshwater pearl culture," *Gems Gemmol.*, 2007, pp. 138-145, vol. 43.
Fritsch, E., et al., "The history and gemology of queen conch 'pearls'," *Gems Gemmol*, 1987, pp. 208-221, vol. 23, No. 3.
Norton, J.H., et al., "Approaches to improve cultured pearl formation in *Pinctada margaritifera* through use of relaxation, antiseptic application and incision closure during bead insertion," *Aquaculture*, 2000, pp. 1-17, vol. 184.

* cited by examiner

*Primary Examiner* — Monica Williams
*Assistant Examiner* — Joshua Huson
(74) *Attorney, Agent, or Firm* — Saliwanchik, Lloyd & Eisenschenk

(57) ABSTRACT

The subject invention provides methods for producing cultured pearls in gastropods, such as the queen conch, *Strombus gigas*, and other gastropod species (e.g., families Strombidae, Haliotididae and Volutidae), with high success rates. The subject invention also provides cultured pearls produced by the methods as described herein.

14 Claims, No Drawings

METHODS FOR PRODUCING CULTURED PEARLS IN CONCH AND OTHER GASTROPODS

CROSS-REFERENCE TO A RELATED APPLICATION

This application claims the benefit of U.S. provisional application Ser. No. 61/165,157, filed Mar. 31, 2009, which is incorporated herein by reference in its entirety.

BACKGROUND OF INVENTION

A pearl is formed as a result of a defense mechanism against foreign irritants by mollusks. For many species, following the intrusion of the foreign irritant, the mantle tissue of the mollusk secretes aragonite or a mixture of aragonite and calcite (both crystalline forms of calcium carbonate) and conchiolin (a horn-like protein) to coat the irritant. The combination of aragonite and conchiolin is called nacre, or mother-of-pearl. The secretion is repeated many times and the irritant is then covered by several layers of nacre, forming a pearl. Accordingly, pearls produced by the nacre secretion process are called nacreous pearls.

In addition, there are also non-nacreous pearls (sometimes referred to as "calcareous concretions"), that are porcellaneous (i.e., have a low-luster, ceramic-like surface). Many pearls of this type are non-attractive and valueless but among them, pearls in species such as conch (*Strombus gigas*), and various scallop species are still of interest.

A conch pearl is produced by the conch family Strombidae. Conch pearls display various colors that range from white to brown with a wide variation in yellow, pink and orange hues (Fritsh and Misiorowski, 1987; Federman and Bari, 2007). For example, the queen conch, *Strombus gigas*, naturally produces valuable pearls that can exhibit an attractive pink color (Acosta-Salmon and Davis, 2007). The conch pearl frequently exhibits a characteristic "flame" structure or pattern on its surface. This flame effect, also called "chatoyancy," is caused by fibrous prismatic crystals perpendicularly aligned to the surface of the pearl (Federman and Bari, 2007). Unfortunately, natural conch pearl products are lacking around the world because of their rarity. Their desirability warrants the need for cultured conch pearls.

There are two main techniques for the production of cultured pearls. One is the technique used in marine pearl oysters, developed and refined by the Japanese in the early 1900s, in which a nucleus (or bead) and a piece of mantle tissue from a donor pearl oyster are implanted into the gonad of a recipient pearl oyster, a process known as "grafting," "beading" or "seeding" (Acosta-Salmón et al., 2004; CIBJO, 2006). Generally only one or two nuclei can be implanted at one time, depending on the pearl oyster species and the grafting technician.

The second technique is used in freshwater mussels. This technique has many variations and has been continuously developing (Fiske and Shepherd, 2007). Briefly, it involves grafting pieces of mantle tissue from a donor mussel into the mantle of a recipient mussel (Dan and Ruobo, 2003; Fiske and Shepherd, 2007); this process is frequently called "tissue nucleation," although this term is incorrect because the mantle tissue is never the nucleus in a non-beaded cultured pearl. Grafting success rates for cultured pearl production vary widely. For example, mortality of freshwater mussels at the first pearl harvest is around 90% (Fiske and Shepherd, 2007). On the other hand, after grafting the blacklip pearl oyster, *Pinctada margaritifera*, 10% of the oysters died and a further 20% rejected the nucleus (Ellis and Haws, 1999). Mortalities between 2 and 24% and bead rejections between 9 and 16% were observed in *P. margaritifera* subjected to different post grafting treatments (Norton et al., 2000).

U.S. Pat. No. 3,871,333 discloses a method of producing cultured pearls in abalones by perforating a hole through the shell of the abalone, depositing a nucleus bead on the reproductive organ of the abalone through the hole, covering the hole, and raising the treated abalone until pearls are formed.

EP Patent Application No. 1,084,615 discloses a nucleus for producing blister or mabé pearls in mollusks. The nucleus is generally bell-shaped with a dome and a peripheral edge portion. The surface of the peripheral edge portion and some or all of the dome includes one or more steps which start at, or adjacent to, the outer edge. The steps assist by providing a key for the deposition of nacre. The nucleus may be secured to the shell of the mollusk in a variety of ways.

U.S. Pat. No. 5,347,951 discloses a process for nucleating pearls in shell-bearing mollusks by forming an opening in the shell of a host mollusk in a region covering a soft tissue, providing a pearl nucleus having a first portion around which nacre forms and a second portion securely connected to the first portion and having a region larger than the size of the opening, and manually inserting the nucleus through the opening to an implanted position.

PCT Application No. PCT/NZ98/00167 discloses a nucleus for the production of half or mabe pearls in mollusks. The nucleus comprises a first portion having an external surface adapted to define the shape of the half or mabe pearl to be produced and a second portion that defines a bridge between the first portion and the shell of the host mollusk. The half or mabe pearls so produced have a substantially even cross section of nacre formed over the nucleus, and a generally reduced time is required for the formation of the pearl.

Published U.S. Patent Application No. 2004/0112086 discloses a method of producing pearls including inserting a nucleus into a mollusk able to produce a pearl, incubating the nucleus within the mollusk, and removing a portion of the nacre coating, thereby exposing a portion of the nucleus.

The techniques described in the above disclosures all have certain drawbacks, such as the necessity for perforating a hole in the shell at a location covering a soft tissue, which is often difficult and causes high mortality. Thus, although queen conch aquaculture methods are well established (Davis and Shawl, 2005), attempts to develop techniques to produce cultured pearls in this species have been unsuccessful to date (Federman and Bari, 2007).

There is a considerable need for a method of commercially culturing conch (family Strombidae) pearls and pearls from other gastropods (e.g., families Haliotididae and Volutidae). The subject invention provides methods for culturing non-beaded and beaded conch pearls with success rates (retention and survival) comparable with those achieved in commercial oyster pearl operations.

BRIEF SUMMARY

The subject invention provides methods for the production of cultured pearls in the queen conch, *Strombus gigas*, and other gastropod species (e.g., families Strombidae, Haliotididae and Volutidae).

In a preferred embodiment, the method of the subject invention comprises pretreating a recipient conch with a relaxant, cutting an incision into the recipient conch; cutting a subepithelial canal through the incision, inserting a mantle tissue piece in the subepithelial canal, optionally inserting a nucleus in the subepithelial canal, culturing the recipient conch to obtain a cultured pearl, and harvesting the cultured pearl.

The incision may be performed on the skin of any part of the body inside the shell of a recipient gastropod. Preferably the incision is made on the skin of the foot and the subepithelial canal is cut into the soft tissue of the conch.

In one embodiment, beaded pearls are formed by inserting both the mantle tissue piece and the nucleus in the subepithelial canal.

In another embodiment, non-beaded pearls can be cultured by inserting only the mantle tissue in the canal.

The subject invention also provides cultured pearls produced by the method as described herein. In one embodiment, the subject invention provides nucleated cultured pearls, wherein the pearl comprises an inner nucleus and outer non-nacreous, calcareous layers. In another embodiment, the subject invention provides non-nucleated cultured pearls, wherein the pearl comprises an inner cavity and outer non-nacreous, calcareous layers. In a preferred embodiment, the pearl is cultured in *Strombus gigas*.

DETAILED DISCLOSURE

The subject invention provides methods for the production of cultured pearls in the queen conch, *Strombus gigas*, and other gastropod species (e.g., families Strombidae, Haliotididae and Volutidae). The subject invention also provides nucleated and non-nucleated pearls cultured in the queen conch, *Strombus gigas*, and other gastropod species.

In a preferred embodiment, the method of the subject invention comprises pretreating a recipient conch with a relaxant, cutting an incision into the recipient conch; cutting a subepithelial canal through the incision, inserting a mantle tissue piece in the subepithelial canal, optionally widening the incision and inserting a nucleus in the subepithelial canal, culturing the recipient conch to obtain a cultured pearl, and harvesting the cultured pearl. In a preferred embodiment, the shell of the conch is not perforated.

Preferably the incision is made on the skin of the foot and the subepithelial canal is cut into the soft tissue of the conch.

In one embodiment of the subject invention, beaded pearls are formed by inserting both the mantle tissue piece and the nucleus in the subepithelial canal.

In another embodiment, non-beaded pearls can be cultured by inserting only the mantle tissue in the canal.

The subject invention also provides cultured pearls produced by the method as described herein. In one embodiment, the subject invention provides nucleated cultured pearls, wherein the pearl comprises an inner nucleus and outer non-nacreous, calcareous layers. In another embodiment, the subject invention provides non-nucleated cultured pearls, wherein the pearl comprises an inner cavity and outer non-nacreous, calcareous layers. In a preferred embodiment, the pearl is cultured in *Strombus gigas*.

In one embodiment, the cultured pearls comprise a taggant that makes it possible to identify pearls produced according to the subject method. The taggant can be any detectable molecule and/or source of radiation. The taggant may be associated with a nucleus used in the method of the subject invention. In preferred embodiments, the nucleus is one that is not found in pearls produced naturally in conch.

According to one aspect of the subject invention there is provided a method of growing pearls, comprising the steps of:
pretreating a recipient gastropod by a relaxant;
cutting an incision into the recipient gastropod in the skin of the foot;
cutting a subepithelial canal through the incision;
inserting a mantle tissue piece and/or a nucleus from a donor in the subepithelial canal;
culturing the recipient gastropod to obtain a cultured pearl; and
harvesting the cultured pearl.

Preferably the recipient is a queen conch, *Strombus gigas*. However it is envisaged that any conch (e.g., family Strombidae) or similar gastropod species (e.g., *Melo melo* and *Haliotis* sp. and other species in the families Haliotididae and Volutidae) can be used as the recipient according to the subject invention.

The mantle donor is preferably a mollusk. Preferably a healthy conch is used as the donor conch. Preferred donor species include any conch (e.g., family Strombidae) or similar gastropod species (e.g., *Melo melo* and *Haliotis* sp. and other species in the families Haliotididae and Volutidae). However it is envisaged that any mollusk species, such as for example, gastropods, saltwater mollusks, freshwater mussels, abalones, can be used as the mantle donor according to the subject invention. The mantle donor conch is selected following similar criteria to that used for pearl oyster mantle donors. For example, a healthy conch has a healthy shell and well defined (e.g., pink) coloration in the interior of the shell.

In a preferred embodiment of the subject invention, the cutout mantle tissue piece has a generally rectangular shape and is, for example, about 2 mm to about 5 mm in length and/or width. Alternatively, the cutout mantle tissue piece has a size of about 2.5 mm to about 4.5 mm, or about 3.5 mm to about 4 mm. For a queen conch, the preferred size of the piece is between about 2-4 mm.

In a preferred embodiment of the method of the subject invention a relaxant is used for relaxation of the recipient conch. Examples of the chemical relaxant include, but are not limited to, chloral hydrate, 2-phenoxyethanol, benzocaine, magnesium chloride, menthol and any chemical combination thereof. It is preferred that the relaxants and dose thereof have rapid response, are non-toxic, and allow for complete recovery of the conch. For example, the recipient queen conch can be relaxed by about 30 g/L of magnesium chloride for at least about 20 minutes.

The incision may be performed on the skin of any part of the body inside the shell of a recipient gastropod. Preferably the incision is made on the skin of the foot and the subepithelial canal is cut into the soft tissue of the conch.

In general, up to about 1, 2, 3, 4, 5, 6, 7, 8, 9, or 10 incisions may be performed on each recipient conch. In certain embodiments, up to about 15, 20, 25, 30, 35, or 40 incisions may be performed on each recipient gastropod. The optimal number of incisions per recipient may vary, depending on the size of the recipient, the size and shape of nucleus, the size and shape of mantle tissue, and/or the positioning of the mantle tissue piece and the nucleus in the subepithelial canal, all of which can be readily determined by those skilled in the art having the benefit of the teachings of the present invention.

The subepithelial canal, at the end of which the nucleus and/or the mantle tissue piece is inserted, is cut through the incision. In one embodiment, a cut is made between the muscle and skin.

The size of the incision and/or the subepithelial canal may be of any width or depth suitable for inserting the mantle tissue piece and/or the nucleus into the recipient gastropod species. For the production of non-beaded pearls, the depth and/or width of the incision and/or the subepithelial canal is typically up to about 3 mm, about 4 mm, about 5 mm, about 6 mm, or about 7 mm. For production of beaded conch pearls, the depth and/or width of the subepithelial canal is typically up to about 6 mm, about 7 mm, about 8 mm, about 9 mm, about 10 mm, about 13 mm, about 15 mm, or about 18 mm.

In a preferred embodiment, the mantle tissue piece is inserted with shell-producing cells facing the incision.

In a preferred embodiment, the nucleus should be commercial grade, such as for example, commercial grade nucleus made from freshwater mussels of the Mississippi River, similar to those used in the pearl oyster industry.

In preferred embodiments, the nucleus is not sand, dirt, shell from the recipient, or other materials that act as the nucleus when pearls are produced naturally in conch. In one embodiment, the nucleus is free of harmful bacteria, or is even sterile.

Typically, the nucleus is spherical in shape, and has a diameter of about 5 mm to about 10 mm, although a nucleus of less than 5 mm or greater than 10 mm may also be used. The size of the nucleus should allow insertion into the canal. Preferably the nucleus is gently pushed to maintain the normal state of the conch. Too much pressure may cause the nucleus to pierce the skin or body.

According to one aspect of the subject invention, there is provided a method of growing beaded pearls, wherein both a nucleus and a mantle tissue piece are inserted.

In a preferred embodiment, the subject invention uses a recipient conch that is sufficiently large to receive the nucleus. The larger the conch, the larger the nucleus it can receive.

According to another aspect of the subject invention, there is also provided a method of growing non-beaded pearls, wherein only a mantle tissue piece per incision is inserted.

The subject invention also provides a pearl that has been cultured in a conch or other gastropod using a method of the subject invention. Thus, in one embodiment the subject invention provides pearls produced by inserting into a recipient conch a nucleus and/or a mantle tissue piece through an incision into a subepithelial canal.

The nucleus used according to the subject invention may be specifically designed so that the pearl produced by the method of the subject invention can be identified. Thus, the nucleus may have, for example, an identifiable taggant. The taggant may be identifiable through physical means, including shape, density, size, and the like; chemical means; and/or radiological means.

The cultured pearls may have a substantially spherical (beaded) shape; a substantially symmetrical shape such as pear, oval, tear drop, or heart; or a baroque shape. The shape may be influenced by the physical characteristics of the nucleus and the mantle tissue piece and the culture conditions of the cultured conch. The cultured pearls may display various colors that range from white to brown with a wide variation in yellow, pink and orange hues.

The size and weight of the cultured pearl may vary, depending on the size of the recipient, the size and shape of nucleus, the size and shape of mantle tissue, and/or the culture time and condition. In certain embodiments, the cultured pearls of the subject invention have a size (length and/or diameter) of about 2 mm to about 15 mm, about 3 mm to about 12 mm, about 4 mm to about 10 mm, or about 5 mm to about 7 mm in diameter. However, cultured pearls with a size of less than 2 mm or greater than 15 mm may also be formed. In a specific embodiment, the cultured conch pearls have a size of about 2 mm to about 8 mm, or about 3 mm to about 5 mm in diameter.

In certain embodiments, the cultured pearls of the subject invention have a weight of about 0.5 to about 7 carats, about 1 to about 5 carats, about 1.5 to about 3 carats, or about 2 to about 3 carats. However, cultured pearls with a weight of less than 0.5 carat or greater than 5 carats may also be formed. In a specific embodiment, the cultured conch pearls have a weight of about 0.5 to about 5 carats, about 1 to about 4 carats, about 1.5 to about 3 carats, or about 2 to about 3 carats.

The culture time may vary according to the conch and the culture condition. Typically, it takes over one year of culture to produce queen conch non-beaded cultured pearls with a mean weight of 1-2 ct (1 ct=200 mg) and about one year to produce beaded cultured pearls larger than 7 mm in diameter (3-5 ct) in the queen conch if beaded with 5.1 mm nuclei (1.7 bu).

The cultured pearls may comprise molecules associated with the recipient gastropod. These molecules may be, for example, conch (or other gastropod) protein and/or DNA. These molecules can be detected utilizing assays that are well known in the art. Advantageously, the nucleus of the cultured pearl is, preferably, different from the nucleus that would be found in natural pearls.

Advantageously, pearls can be produced in large numbers according to the subject invention. This unique process makes it possible, for the first time, to transport conch (or other gastropod) pearls in large quantities. Thus, in one embodiment, the subject invention provides a container having enclosed therein multiple conch (or other gastropod) pearls. Preferably the container has more than 5, 10, 15, 20, 25, 50, 100, or even 500 pearls. Examples of containers include boxes, bags, sacs and the like. Preferably the container is man-made. The container preferably encloses a volume of less than 10, 8, 5, 3, 2, 1, 0.5, 0.2, 0.1 or even 0.05 liters.

The cultured pearls of the present invention can be identified using standard identification techniques well known in the jewelry industry. For instance, conch pearls can be identified based on their non-nacreous, calcareous compositions and the characteristic "flame structure" that is reminiscent of a fire burning on the surface. In addition, cultured pearls can be distinguished from natural pearls using X-ray examination to unveil the internal growth structure. For instance, bead-nucleated cultured pearls typically have a solid nucleus in the center without any concentric growth ring, whereas natural pearls have concentric growth rings. Also, beadless, non-nucleated cultured pearls may have growth rings, but they also have a void, inner cavity. Thus, the type, quality, shape, size, and color of the cultured pearls can be readily determined by those skilled in the jewelry industry.

Following are examples that illustrate procedures for practicing the invention. These examples should not be construed as limiting.

EXAMPLE 1

Culturing Queen Conch, Strombus Gigas, Pearls

A medium sized queen conch was relaxed with 30 g $L^{-1}$ of magnesium chloride for at least 20 minutes. A large pearl oyster shell holder was used to hold the conch and a heavy vice-grip was used to clamp on the conch's operculum and to gently pull the conch out of the shell. To obtain mantle tissue a pair of tissue forceps and a scalpel were used. The cutout piece of tissue was then laid on a plastic cutting board and blot dried using a sponge or paper towel. The same scalpel was used to cut the mantle tissue into small squares.

For the production of non-beaded cultured pearls, the scalpel was used to cut a small incision into the tough skin on the conch foot. Once this incision was made, the mantle or tissue inserter was used to cut a subepithelial canal into the conch soft tissues. After that, a piece of mantle tissue was inserted using a tissue inserter. Due care to place the tissue with the shell producing cells facing the incision, should be taken.

For the production of beaded cultured pearls, in addition to the previous steps, a hook and a nucleus inserter can be used. After the small incision is made with the scalpel knife, a side knife can be used to widen the incision and the canal. Using the guided scalpel, an incision is made into the conch soft tissues, carefully guiding the scalpel between the foot muscle and the foot skin. After the incision, a piece of mantle tissue can be inserted using a tissue inserter. A nucleus can then be inserted through the incision using a nucleus inserter. It is difficult to observe the piece of mantle tissue making contact with the nucleus. However, this technique has proven to be very effective. If applied correctly, this technique will provide almost 100% nucleus retention and 0% mortality 6 weeks after implant.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

REFERENCES

Acosta-Salmón, H., Davis, M., 2007. Inducing relaxation in the queen conch *Strombus gigas* (L.) for cultured pearl production. Aquaculture 262, 73-77.

Acosta-Salmón, H., Martínez-Fernández, E., Southgate, P. C., 2004. A new approach to pearl oyster broodstock selection: can saibo donors be used as future broodstock? Aquaculture 231, 205-214.

CIBJO, 2006. The Pearl Book. Natural, Cultured and Imitation Pearls—Terminology and Classification. CIBJO/Gem Materials. CIBJO 60 pp. http://www.gema. com/information/CIBJO/CIBJO%20Pearl%20Book%20-%202006-1.pdf (accessed on Feb. 15, 2008)

Dan, H., Ruobo, G., 2003. Freshwater pearl culture in China. Global Aquaculture Advocate 6(3), 50-51.

Davis, M., Shawl, A. L., 2005. A guide for culturing queen conch. Am. Fish. Soc. Symp. 46, 125-142.

Ellis, S., Haws, M., 1999. Producing pearls using the black-lip pearl oyster (*Pinctada margaritifera*). Aquafarmer Information Sheet. Center for Tropical and Subtropical Aquaculture Special Publication No 141. December 1999.

Federman, D., Bari, H., 2007. The Pink Pearl. A Natural Treasure of the Caribbean. Skira, Milan, Italy. 176 pp.

Fiske, D., Shepherd, J., 2007. Continuity and change in Chinese freswater pearl culture. Gems Gemmol. 43, 138-145.

Fritsch, E., Misiorowski, E. B., 1987. The history and gemology of queen conch 'pearls' Gems Gemmol. 23(3), 208-221.

Norton, J. H., Lucas, J. S., Turner, I., Mayer, R. J., Newnham, R., 2000. Approaches to improve cultured pearl formation in *Pinctada margaritifera* through use of relaxation, antiseptic application and incision closure during bead insertion.

We claim:

1. A method of growing a cultured pearl of at least 0.5 carats in a gastropod comprising the steps of:
   a) pretreating a recipient gastropod with a relaxant, wherein the recipient gastropod is a Strombidae or Volutidae species;
   b) cutting an incision into the foot of the recipient;
   c) cutting a subepithelial canal through the incision;
   d) inserting a mantle tissue piece and/or a nucleus from a donor in the subepithelial canal;
   e) culturing the recipient gastropod to obtain a non-nacreous cultured pearl of at least 0.5 carats; and
   f) harvesting the cultured pearl;
   wherein the shell of the recipient gastropod is not perforated and wherein the recipient gastropod is not killed by the culturing method.

2. The method, according to claim 1, wherein both a nucleus and a mantle tissue piece are inserted to obtain a nucleated cultured pearl.

3. The method, according to claim 1, wherein a mantle tissue piece is inserted with shell producing cells facing the incision.

4. The method, according to claim 1, wherein only a mantle tissue piece is inserted to obtain a non-nucleated cultured pearl.

5. The method, according to claim 1, wherein only a nucleus is inserted to obtain a nucleated cultured pearl.

6. The method, according to claim 1, wherein the recipient gastropod is *Strombus gigas* or *Melo melo*.

7. The method, according to claim 1, wherein the mantle is from a mollusk.

8. The method, according to claim 7, wherein the mantle is from a *Strombus gigas* or *Melo melo* species.

9. The method, according to claim 1, wherein the relaxant is magnesium chloride.

10. The method, according to claim 1, wherein the nucleus comprises a physical, chemical, or radiological taggant.

11. The method, according to claim 1, wherein the recipient gastropod is a Strombidae species.

12. The method, according to claim 1, wherein the recipient gastropod is *Strombus gigas*.

13. The method, according to claim 1, wherein the recipient gastropod is a Volutidae species.

14. The method, according to claim 1, wherein the recipient gastropod is *Melo melo*.

\* \* \* \* \*